United States Patent [19]

Wah et al.

[11] 4,080,081

[45] Mar. 21, 1978

[54] METHOD OF JOINING A RATTAN POLE TO A MEMBER

[76] Inventors: Wong Kam Wah; Ting Yuet Kam, both of 10 Man Wan Road 17th Floor, Block C, Waterloo Hill, Kowloon, Hong Kong

[21] Appl. No.: 727,266

[22] Filed: Sep. 27, 1976

[30] Foreign Application Priority Data

Mar. 2, 1976  United Kingdom ............... 8275/76

[51] Int. Cl.² .............................................. F16B 7/00
[52] U.S. Cl. ..................... 403/237; 403/260
[58] Field of Search ............... 403/296, 343, 43, 44, 403/45, 46, 47, 48, 299, 200, 201, 260, 258, 388, 234, 237; 85/42, 4

[56] References Cited

U.S. PATENT DOCUMENTS

| 19,205 | 1/1858 | Pollard | 85/42 UX |
|---|---|---|---|
| 1,460,928 | 7/1923 | Tilden | 403/260 X |
| 1,579,422 | 4/1926 | Wempe | 403/260 |
| 1,734,340 | 11/1929 | Overton | 403/258 X |
| 1,884,491 | 10/1932 | Ziemann | 403/258 X |
| 2,172,611 | 9/1939 | Gerhardt et al. | 403/388 X |
| 3,469,869 | 9/1969 | Ramakers | 403/264 |

FOREIGN PATENT DOCUMENTS

| 114,469 | 4/1926 | Switzerland | 403/299 |
|---|---|---|---|
| 349,451 | 11/1960 | Switzerland | 403/48 |
| 1,792 of | 1879 | United Kingdom | 403/388 |
| 1,148,687 | 4/1969 | United Kingdom | 403/258 |

Primary Examiner—Andrew V. Kundrat
Attorney, Agent, or Firm—McCormick, Paulding & Huber

[57] ABSTRACT

Several rattan furniture joints are disclosed, one comprising a T-shaped connection for two rattan poles, a second joint having the poles parallel and alongside one another, and the third joint having the poles connected end-to-end. In each of these three types of joint two internally threaded plastic inserts are pinned in aligned openings in the poles, and a threaded male stud or shank member is provided to connect the two poles. The method provides for rotating one plastic insert with respect to the other to facilitate the assembly of the parts, and this assembly step can be achieved by providing a slotted head on at least the rotatable insert, or merely by virtue of the fact that one pole can be rotated with respect to the other during assembly.

7 Claims, 8 Drawing Figures

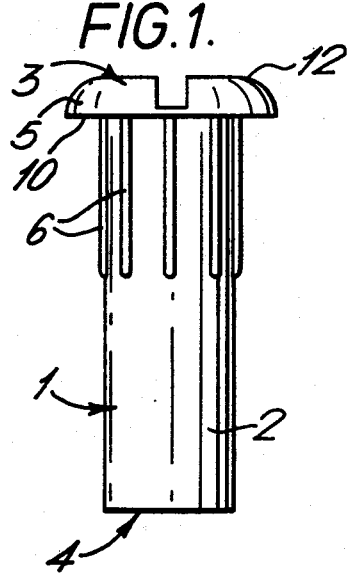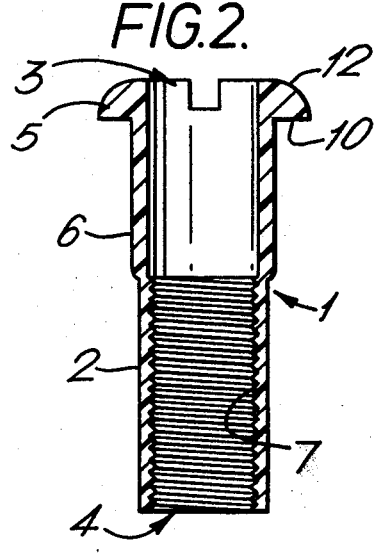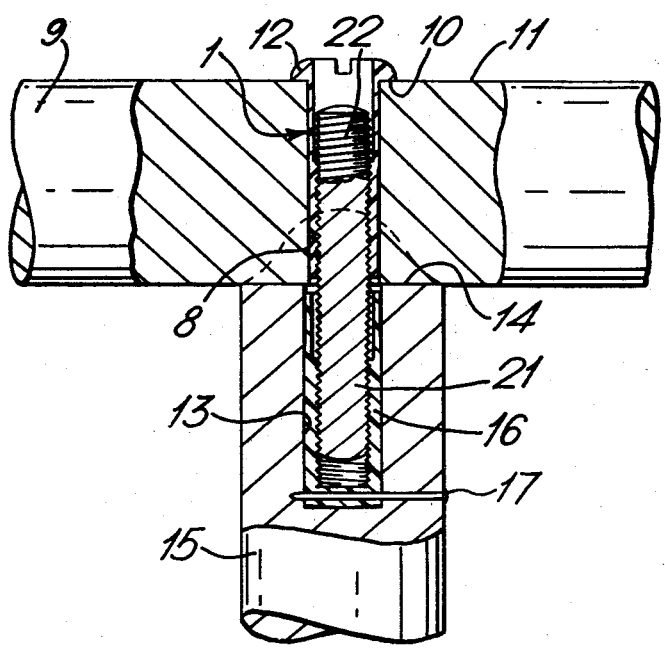

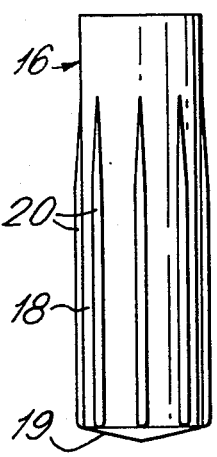
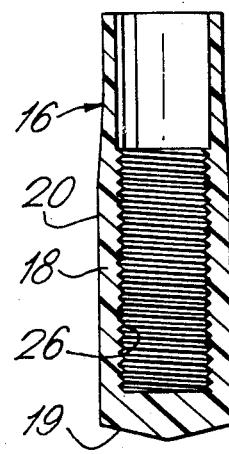
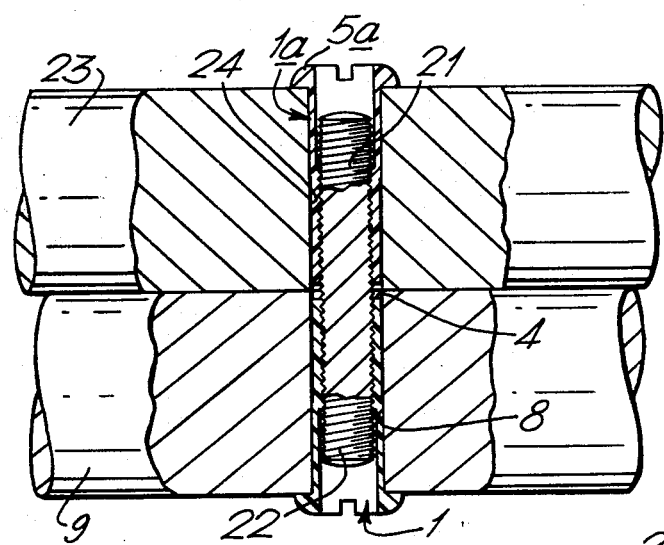
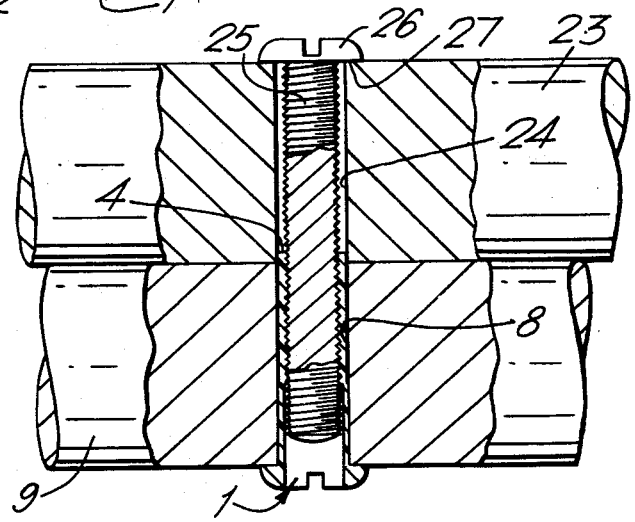

METHOD OF JOINING A RATTAN POLE TO A MEMBER

This invention relates to a method of joining a rattan pole to a member, particularly in the fabrication of rattan furniture where it is necessary to join rattan poles together or, for example, a rattan pole to a seat portion of a rattan chair.

A method of joining a screw-threaded shank to a rattan pole has previously been proposed in our United Kingdom patent application No. 779/75 and it is an object of the present invention to provide a modification to and extension of this method. The U.S. patent application corresponding to said United Kingdom application comprises U.S. Ser. No. 638,822, filed Dec. 8, 1975, and now U.S. Pat. No. 4,008,971.

According to the present invention there is provided a method of joining a rattan pole to a member, which comprises forming a first hole in the member and locating a screw-threaded shank in the first hole so that the shank projects therefrom, forming a second hole in the rattan pole which second hole is open at both ends, inserting a headed and internally screw-threaded first sleeve into the second hole, and screw-threadedly engaging the projecting portion of the shank and the first sleeve, the arrangement being such that only by unscrewing the shank and the first sleeve can the pole and member be separated.

Further according to the present invention, there is provided a joint between a rattan pole and a member when formed by the method described in the immediately preceding paragraph.

By the term "headed" as used throughout this specification and claims with reference to an article, it is intended to mean that there is a portion of the article, known as the head, which is of greater cross-sectional area than substantially the remainder of the article, and which head may be provided, for example, by a flange.

The aforementioned member may comprise a second rattan pole, or for example, a seat portion of a rattan chair. The first hole in the member may comprise a blind bore or it may be open at both ends, generally depending upon the structure of the member, and upon how the member and rattan pole are to be joined.

Where the first hole in the member comprises a blind bore, as may be the case when the member is a second rattan pole which is to be connected to the first rattan pole to form a T-shaped structure, or when the member is a seat portion of a rattan chair, the screw-threaded shank may be located therein by, for example, screwing it into a corresponding internal screw-thread in the first hole or by means of adhesive. Preferably, however, an internally screw-threaded second sleeve is located in the first hole and the screw-threaded shank is screwed into the second sleeve so that the shank projects from the first hole. The second sleeve should be located in the first hole in such a manner that it may not be easily drawn out, nor rotated therein. Such retention may be by friction, by adhesive, or where practical, by means of a pin, and the second sleeve may be provided with integral and external longitudinally extending ribs so as to facilitate its retention within the first hole by friction.

The second sleeve may comprise a substantially tubular insert which may be closed at one end and into which the screw-threaded shank should be inserted so that it projects from the other end of the sleeve. Where the first hole is open at both ends, as may be the case in joining two rattan poles so as to extend in substantially parallel axial planes, a second sleeve may also be provided, but it should be headed at the one end, so that it may be identical to the first sleeve. When the rattan pole and member are joined by the shank and two headed sleeves, by inserting the sleeves into their respective holes so that each head is adjacent one end of its hole, screwing the shank into the sleeve in the member so that it projects from the other end of the sleeve, and of the hole, and screwing the projecting portion of the shank into the other sleeve, separation is prevented, except by unscrewing the shank, as the heads of the sleeves may not be drawn through their respective holes from said one end towards said other end.

Furthermore, where the first hole is open at both ends, the shank may be headed so that no second sleeve is necessary. This method of joining will be substantially the same as for two headed sleeves, except that the head on the shank will replace the second headed sleeve.

Preferably, the or each head may be associated with a rebate around the periphery of the respective end of the hole in which the head may be located. Conveniently the rebate is of such a depth that the head does not project externally of the rattan pole or member, respectively.

It is preferred that the or each headed and internally screw-threaded sleeve is firmly retained in its respective hole, and such retention may be by friction, by adhesive or by pinning. Each sleeve may also be provided with integral and external longitudinally extending ribs (i.e. extending lengthwise of the hole in which the sleeve is adapted to be inserted), so as to facilitate its retention in the hole by friction. Each hole, and an associated sleeve, will generally have a substantially circular cross-section, but rotation of the sleeve relative to the hole may be alleviated by providing both the sleeve and hole with a polygonal lateral cross-section.

Preferably, each sleeve is made of a plastics material such as nylon, the colour of which may be adjusted to match the colour of the rattan pole and member. An advantage of the method of the present invention, except where a headed shank is employed, may be that the only portion of the fixing means exposed on the surface of the pole and member being joined is one, or possibly two, heads of the respective sleeves. The shank will generally be of a metallic material in order to provide sufficient strength to the join, and where a headed shank is employed, the head thereof may conveniently be hidden from general view by locating it on a not-normally exposed surface.

According to a further aspect of the present invention, there is provided a method of joining two rattan poles in end-to-end relationship by means of a screw-threaded shank, the method comprising forming an axial hole in the respective ends of the rattan poles that are to be joined together, locating an internally screw-threaded sleeve within each hole, fixing each sleeve in its respective hole, screwing the shank into one of the internally screw-threaded sleeves so that the shank projects therefrom and screwing the projecting portion of the shank into the other of the internally screw-threaded sleeves.

Various embodiments of how the invention may be put into effect will now be described, by way of example only, with reference to the accompanying drawings, in which:

FIG. 1 is a side elevation of a headed and screw-threaded sleeve for use in the method according to the present invention;

FIG. 2 is a cross-sectional view of the sleeve shown in FIG. 1;

FIG. 3 is a part cross-sectional side view showing two rattan poles joined together by a first embodiment of the method of the present invention;

FIGS. 4 and 5 are, respectively, a side elevation and a cross-sectional view of a substantially tubular insert as used in the first embodiment of the method of the invention shown in FIG. 3;

FIG. 6 is a part cross-sectional side view showing two rattan poles joined together by a second embodiment of the method of the present invention;

FIG. 7 is a part cross-sectional side view showing two rattan poles joined together by a third embodiment of the present invention.

In the following description of the drawings similar parts in each of the embodiments will be given the same reference character whenever possible.

Figure 8:
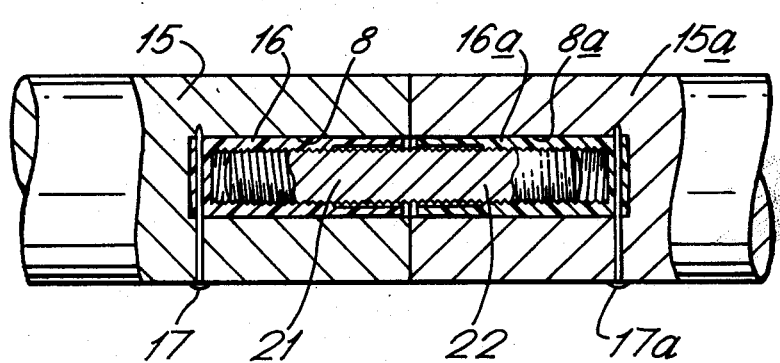
FIG. 8 is a sectional side view of two rattan poles joined together in end-to-end relationship by a fourth embodiment of the present invention.

The method of the present invention described in the first three embodiments utilises a first sleeve 1 similar to that shown in FIGS. 1 and 2. The first sleeve 1 is preferably formed of a moulded plastics such as nylon, and comprises a tubular body 2 which is open at both ends 3 and 4. End 3 of the body 2 carries a head 5 from which extend ribs 6 in parallel array on the external wall of the body 2. The internal wall of body 2 has a screw-thread 7 extending from end 4 for part of the length of the body 2.

Referring to FIGS. 3, 6 and 7, the first sleeve 1 is urged as a force fit into a hole 8 extending through the thickness of a rattan pole 9, the hole 8 being open at both ends. The ribs 6 on the external wall of the first sleeve 1 assist in providing a relatively tight friction fit in the hole 8, so that the sleeve 1 may not be rotated therein. Further means, such as adhesive may also be used to help retention of the first sleeve 1 within hole 8. The first sleeve 1 is urged into the hole 8 to such an extent that the base 10 of the head 5 thereof rests against the surface 11 of the rattan pole 9. In a variation, not shown, the periphery of the end of the hole 8 which the head 5 abuts may be rebated so that the top surface 12 of the head lies below or substantially flush with the surface 11.

The hole 8 in the rattan pole 9 is shown extending diametrically through the pole, but in a further variation, not shown, the hole may be formed at an acute angle to the axis of the pole.

Referring now particularly to FIG. 3, a blind bore 13 is formed in one end 14 of a second rattan pole 15 to extend axially thereof. According to the method of the present invention, a tubular second sleeve 16 is urged into the bore 13 and firmly located therein by means of a pin 17. The second sleeve 16 is shown in greater detail in FIGS. 4 and 5 and comprises a substantially tubular body 18 which is preferably formed of a plastics material such as nylon, and which is closed at one end 19. The body 18 is internally screw-threaded at 26 and is provided with longitudinally extending ribs 20 on its external wall to assist a friction fit within the bore 13.

A correspondingly screw-threaded shank 21 is screwed into the second sleeve 16, the pin 17 being so located that it does not interfere with the screw-threaded engagement between the shank 21 and insert 16. The first sleeve 1 located in the rattan pole 9 is then screwed on to a projecting portion 22 of the shank 21 until there is tight engagement between the two rattan poles.

Preferably the length of the projecting portion 22 of the shank is such that it does not project through the one end 3 of the first sleeve 1 when the T-joint is assembled. Furthermore, preferably the end 14 of the second rattan pole 15 is substantially saddle-shaped, being concave with a radius of curvature equal to half the diameter of the pole 9 so as to receive the pole 9 and prevent any inadvertent twisting movement between the two poles 9 and 15.

FIG. 6 shows a second embodiment of the present invention in which two rattan poles 9 and 23 are joined in such a manner that they extend in parallel axial planes. The second rattan pole 23 is provided with a lateral bore 24 which is open at both ends and in which is firmly located a second sleeve 1a which is substantially identical to the first sleeve 1 in hole 8 of pole 9. A screw-threaded shank 21 is screwed into the second sleeve 1a so that the projecting portion 22 extends from the other end thereof, remote from head 5a of second sleeve 1a. The projecting portion 22 may then be screwed into first sleeve 1 from end 4 thereof until there is tight engagement between the two poles 9 and 23. The shank 21 should preferably be screw-threadedly adjusted in the sleeves 1 and 1a so that it does not project outwardly from either. In a variation not shown, one of the sleeves 1 and 1a may be longer than the other, and when the joint is formed may project into the hole in the other pole to give increased rigidity.

FIG. 7 shows a third embodiment of the present invention which is similar to the second embodiment of FIG. 6 in that the two poles 9 and 23 extend in parallel axial planes and that the pole 23 has a lateral bore 24 in it. However the two poles are joined in the third embodiment by passing a headed and screw-threaded bolt 25 through the bore 24 to engage the first sleeve 1 from end 4 thereof. The bolt 25 is screwed into the first sleeve 1 until there is tight engagement between the poles, and the head 26 of the bolt 25 firmly abuts the surface 27 of the pole 23. The bolt 25, and each shank 21 in FIGS. 3 and 6, are preferably, but not essentially, formed of a metal such as steel.

Increased rigidity is given to the joint in FIG. 7 if the sleeve 1 has a body 2 of length greater than the diameter of the pole 9, so that the end portion 4 projects partly into bore 24.

It may be appreciated that in the embodiments of the invention shown in FIGS. 3, 6 and 7, the two rattan poles may not under normal conditions be separated except by unscrewing the shank from a respective one of the sleeves. In order to assist screw-threaded adjustment of the shank, one or both ends thereof may be provided with a screwdriver notch.

In the embodiment shown in FIG. 8, the two poles 15 and 15a are joined together in end-to-end relationship by means of identical sleeves 16 and 16a respectively. The sleeves 16 and 16a are identical to those described with reference to FIGS. 4 and 5 and the method of locating them in their respective holes 13 and 13a is described with reference to FIG. 3. After insertion of the sleeves, the screw-threaded shank 21 should be threaded into one of the sleeves 16, and the other sleeve 16a should then be threaded on to the projecting portion 22 of the shank 21.

What we claim is:

1. A mechanical joint for rattan furniture comprising:
   (a) a first cylindrical member having an opening,
   (b) a second cylindrical member having an opening aligned with said first member opening,
   (c) an internally threaded plastic sleeve in each of said openings, said sleeves extending substantially the full length of said openings,
   (d) means for anchoring at least one of said sleeves in its associated opening and with the other sleeve being slidably seated in its opening for retention therein,
   (e) a screw threaded steel shank threadably received in both sleeves, said shank having a length significanly less than the combined axial length of said sleeves, said shank having no head thereon to provide both ends of said steel shank spaced axially inwardly of and within the plastic sleeves, and said shank being threaded in the same direction throughout its length, and
   (f) means for rotating the other sleeve to assemble said members tightly together.

2. The joint defined by claim 1 wherein said one sleeve anchoring means comprises at least one pin oriented normal to the axis of said threaded sleeve, said one pin located adjacent an inner end of said sleeve.

3. The joint defined by claim 1 wherein means is provided for anchoring said other sleeve in its associated opening, said anchoring means for each sleeve comprising at least one pin oriented normal to the axis of said threaded sleeve, said one pin located adjacent a inner end of said sleeve.

4. The joint defined by claim 1 wherein said one sleeve anchoring means comprises ribs defined on the outside surface thereof, said sleeve formed from a plastic material somewhat harder than said material from which said members are fabricated.

5. The joint defined by claim 1 wherein said means for rotating said other sleeve comprises a headed annular portion thereof, said headed portion defining a flange adapted to abut the associated member, and said headed portion defining a tool receiving socket to facilitate rotation of said other sleeve with respect to said one sleeve.

6. The joint defined by claim 5 wherein said joint is T-shaped with said cylindrical members oriented perpendicular to one another, said first cylindrical member having said one sleeve anchored in an axial end opening at one end thereof, and said first cylindrical member having said one end formed to fit the cylindrical contour of said second cylindrical member.

7. The joint defined by claim 5 wherein said cylindrical members have their respective openings oriented diametrically and said aligned openings extending through said members.